United States Patent [19]

Morimoto

[11] Patent Number: 5,990,811
[45] Date of Patent: Nov. 23, 1999

[54] TRANSFER CLOCK CONVERTER FOR DIGITAL DATA

[75] Inventor: Satoshi Morimoto, Sakai, Japan

[73] Assignee: Sharp Kabushiki Kaisha, Osaka, Japan

[21] Appl. No.: 09/007,076

[22] Filed: Jan. 14, 1998

[30] Foreign Application Priority Data

Jan. 14, 1997 [JP] Japan ..................................... 9-004181

[51] Int. Cl.⁶ .................................................. H03M 7/00
[52] U.S. Cl. .......................................................... 341/61
[58] Field of Search ........................ 341/61, 63; 370/545; 348/441; 375/215

[56] References Cited

U.S. PATENT DOCUMENTS 5,204,676  4/1993  Herrmann ................................. 341/61
5,623,512  4/1997  Sasaki ..................................... 375/211

FOREIGN PATENT DOCUMENTS 01261908  10/1989  Japan .

OTHER PUBLICATIONS

"Report 624, Characteristics of Television Systems" (C.C.I.R. Report XIIIth Plenary Assembly, 1975) pp. 22–52.

*Primary Examiner*—Brian Young
*Attorney, Agent, or Firm*—Birch, Stewart, Kolasch & Birch, LLP

[57] ABSTRACT

A transfer clock converter for digital data of the present invention is a circuit for converting digital data synchronized with a first transfer clock into digital data synchronized with a second transfer clock and outputting the digital data, and includes a plurality of latching elements and a comparator-selector circuit. The comparator-selector circuit compares the output data from predetermined latching elements, selects output data to be output according to the result of the comparison, and outputs the selected output data. With this structure, it is possible to always output correct digital data without using a PLL circuit or the like, thereby significantly improving the reliability.

18 Claims, 11 Drawing Sheets

TRANSFER CLOCK CONVERTER FOR DIGITAL DATA

FIELD OF THE INVENTION

The present invention relates to a transfer clock converter for digital data, for changing the transfer clock for digital data.

BACKGROUND OF THE INVENTION

When a plurality of monitor cameras are used by switching, the use of a zero crossing point of a commercial power supply is a known method of synchronizing video signals of the cameras. In this case, since the clocks in the system are synchronized based on the zero crossing point of the commercial power supply, when the frequency of the commercial power supply changes, the clocks in the system also change. Therefore, when color modulation is performed based on the changed clocks in the system, the frequency of a subcarrier also changes.

According to the C.C.I.R Report (C.C.I.R [1970–1974] Report XIII/624, CHARACTERISTICS OF TELEVISION SYSTEMS), the frequency of subcarrier for performing color modulation by, for example, the NTSC system is 3579535 Hz to 3579555 Hz. Since very high precision is required, in practice, it is difficult to perform a color modulation by using the clocks in the system as they are.

In order to solve the above-mentioned problems, it is necessary to convert a transfer clock for digital data (i.e., convert the clock from CLKA into CLKB) using, for example, a circuit shown in FIG. 3. In FIG. 3, DFFA represents a D-type flip-flop that receives input digital data DATA in synchronization with a rise of a clock CLKA, and outputs the digital data. DFFB is a D-type flip-flop that receives the output digital data D<1:0> from the D-type flip-flop DFFA in synchronization with a clock CLKB that is different from the clock CLKA, and outputs digital data OUT. Each of the D-type flip-flops DFFA and DFFB is arranged by a circuit like the one shown in, for example, FIG. 10.

Note that, in the circuit shown in FIG. 3, it is necessary to satisfy conditions: (a) the clock CLKA and clock CLKB are synchronized with each other, and a predetermined delay is introduced between the output of the D-type flip-flop DFFA in the front stage and the input of the D-type flip-flop DFFB in the back stage; or (b), when such a delay is not introduced, the clock CLKA and clock CLKB are synchronized with each other, and a predetermined phase difference is present between these clocks.

In (b), for example, if these clocks are not synchronized with each other, there is a possibility that the clocks CLKA and CLKB rise at substantially the same time. For instance, as shown in the timing chart of FIG. 4, when the clocks CLKA and CLKB rise at substantially the same time, and when the hold time and the setup time required by the D-type flip flop (latching element) are not ensured sufficiently, it is not certain what data is outputted as an output OUT from the D-type flip-flop DFFB shown in FIG. 3 in a period indicated by hatching in FIG. 4.

The hold time is a period after the edge of the clock, in which data needs to be retained by the latching element. The setup time means a period before the edge of the clock, in which the data needs to be kept by the latching element.

In a prior art (first prior art), in order to solve a problem associated with the substantially simultaneous rise of the clocks CLKA and CLKB, a PLL (phase locked loop) circuit shown in FIG. 7 is used for the control of the phases of the former and latter clocks. As shown in FIG. 7, the PLL circuit includes clock generators 21 and 22, frequency dividers 23 and 24, and a phase comparator 25. The clock generators 21 and 22 generate the clocks CLKA and CLKB, respectively. The frequency dividers 23 and 24 divides the clocks CLKA and CLKB into clocks CLKA2 and CLKB2 (CLKA2= CLKB2), respectively. The phase comparator 24 compares the phases of the clock CLKA2 (reference clock) and the clock CLKB2, and feeds an error output, that varies according to the phase difference, back to the clock generator 22. Such a circuit structure allows the clocks CLKA and CLKB to be synchronized with each other. In the case of (b), the control is carried out so that these clocks are synchronized with each other and a predetermined phase difference is present between the clocks.

In addition, as other prior art (second prior art), Japanese Laid-open Patent Application "Tokukaihei No. 1-261908" is known. This publication discloses a circuit that (1) divides by 1/N a clock of the latching element in the back stage, samples the resultant clock in accordance with a clock of the latching element in the front stage, (2) produces N-phase clocks whose phases differ from each other in accordance with the clock of the latching element in the back stage which has been divided by 1/N and sampled by the clock of the latching element in the front stage, (3) generates N rows of data whose data change points differ from each other by sampling rows of data in accordance with the N-phase clocks, and (4) selects and outputs N rows of data using a time window produced based on the clock of the latching element in the back stage.

According to the second prior art, when converting a row of data having the frequency of the clock of the latching element in the front stage into the frequency of the clock of the latching element in the back stage, the frequency is divided by 1/N so that the converted clock satisfies the sampling theorem. The clock whose frequency has been divided by 1/N is sampled in accordance with the clock before converted. The conversion of clock is carried out using the clock of the latching element in the back stage which was divided by 1/N. As described above, since the conversion of the clock is performed using the clock which was sampled by the clock before converted, the change point of data is not sampled. Thus, N rows of data with different change points are generated according to the clock of the latching element in the back stage, which was divided by 1/N. These rows of data are selected by a time window produced based on the clock of the latching element in the back stage. By selecting these rows of data using the time window, the change point of data is not sampled in performing the final conversion of clock.

However, the above-mentioned prior arts suffer from the following drawbacks. First, in the structure of the first prior art, the phases of both of the clocks are synchronized with each other using a PLL circuit. However, even when the PLL circuit is used, in FIG. 7, since the frequency of the clock CLKB is changed, the precision is improved as compared to the structure using the clock of the system. However, it is still impossible to avoid the change of frequency. Moreover, since both of a digital circuit and an analog circuit are used, the cost, chip area, and the restrictions relating to design increase.

Furthermore, in the second prior art disclosed in the above-mentioned publication "Tokukaihei No. 1-261908", when the frequency $f_1$ of the clock CK1 and the frequency $f_2$ of the clock CK2 shown as examples in FIG. 11 satisfy the relationship, for example, $f_2 = 2 \times f_1$, the cycle of the clock (½)

CK2 and the cycle of the clock CK1 are identical. In this case, whenever the clock CK1 rises in the D-type flip flop 5 shown in FIG. 11a a latching mistake may occur depending on the timing of the rise of the clock CK1 and the clock (½)CK2, causing an incorrect operation. Additionally, when N in $f_2=N\times f_1$ is a positive even integral or a number near the integral number, since the state continues in which the clock CK1 and the clock (½)CK2 rise at substantially the same time, a latching mistake may occur like the above.

SUMMARY OF THE INVENTION

It is an object of the present invention to provide a transfer clock converter for digital data, which can always output correct data with stability.

In order to achieve the above object, a transfer clock converter for digital data of the present invention is a circuit for converting digital data synchronized with a first transfer clock into digital data synchronized with a second transfer clock and for outputting the digital data, and includes: a plurality of latching elements for latching the digital data so that the first transfer clock and the second transfer clock do not rise at the same time; and a comparator-selector circuit for comparing output data (candidate output data) from predetermined latching elements among the plurality of latching elements, selecting output data to be outputted according to the result of the comparison, and outputting the selected output data.

In this structure, it is possible to always output correct digital data without using a PLL circuit or the like, thereby significantly improving the reliability.

For a fuller understanding of the nature and advantages of the invention, reference should be made to the ensuing detailed description taken in conjunction with the accompanying drawings.

DESCRIPTION OF THE PREFERRED EMBODIMENTS

The present invention relates to a transfer clock converter for converting digital data synchronized with a first transfer clock into digital data synchronized with a second transfer clock and for outputting the digital data, and is characterized by generating a plurality of candidate output data based on the input digital data, comparing the candidate output data, selecting output data to be outputted according to the result of the comparison, and outputting the selected output data in performing transfer clock conversion for digital data. With this structure, it is possible to always output correct digital data without using a PLL circuit or the like, and ensure a significant improvement of the reliability. The following description will explain embodiments of the present invention in detail with reference to the accompanying drawings.

Figure 1:
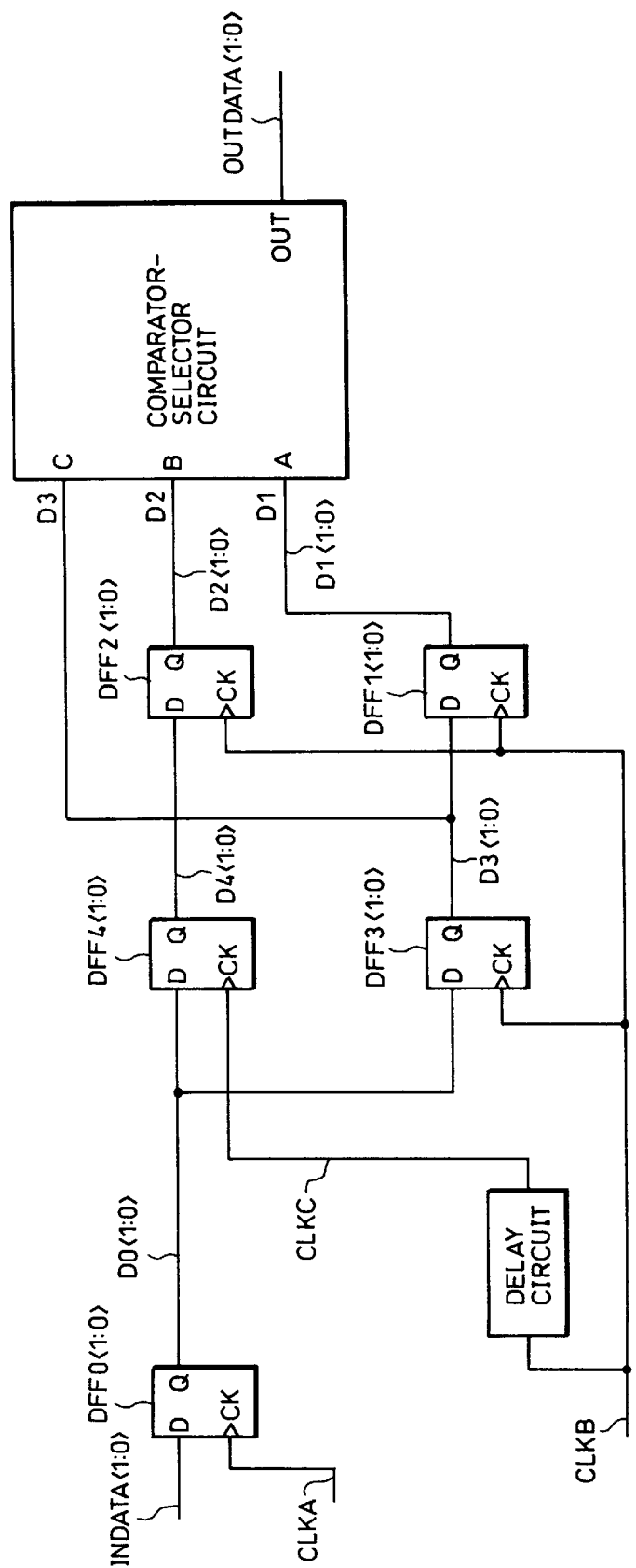
FIG. 1 is a block diagram showing the structure of a transfer clock converter for digital data according to Embodiment 1 of the present invention.

FIG. 1 is a block diagram showing the structure of a transfer clock converter for digital data according to Embodiment 1 of the present invention. In FIG. 1, DFF0 is a D-type flip-flop which receives input digital data INDATA in synchronization with a rise of a first transfer clock CLKA, and outputs the data. DELAY represents a delay circuit which generates a clock CLKC (third transfer clock) by introducing a predetermined delay in a second transfer clock CLKB, and outputs the clock CLKC.

DFF4 is a D-type flip-flop which receives output data D0 of DFF0 in synchronization with a rise of the clock CLKC, and outputs the data. DFF3 is a D-type flip-flop which receives the output data D0 of the D-type flip-flop DFF0 in synchronization with a rise of the second transfer clock CLKB, and outputs the data.

DFF2 is a D-type flip-flop which receives output data D4 of the D-type flip-flop DFF4 in synchronization with a rise of the second transfer clock CLKB, and outputs the data. DFF1 is a D-type flip-flop which receives output data D3 of the D-type flip-flop DFF3 in synchronization with a rise of the second transfer clock CLKB, and outputs the data.

COMPARATOR is a comparator-selector circuit which is supplied with output data D1, D2 and D3 of the D-type flip-flops DFF1, DFF2 and DFF3, executes a predetermined comparing and selecting operation (to be described later) based on these output data, and selects and outputs OUTDATA that is correct output data.

A delay $\delta T_c$ introduced by the delay circuit (DELAY) is set so as to satisfy the condition $$T_H+T_S<\delta T_C<T_B-(T_H+T_S) \quad (1)$$

where $T_H$ represents the hold time of the D-type flip-flop, $T_S$ is the setup time of the D-type flip-flop, and $T_B$ is the cycle of the second transfer clock CLKB.

Figure 10:
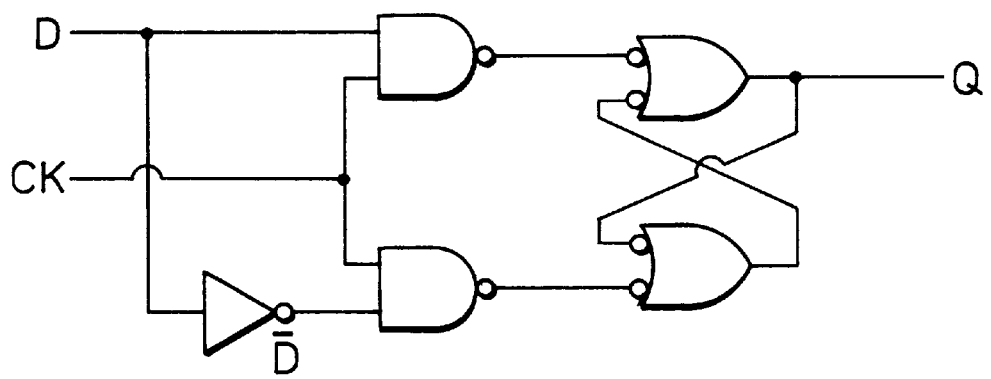
FIG. 10 shows the circuit structure of a D-type flip-flop to illustrate a conventional example and the present invention.
Figure 11:
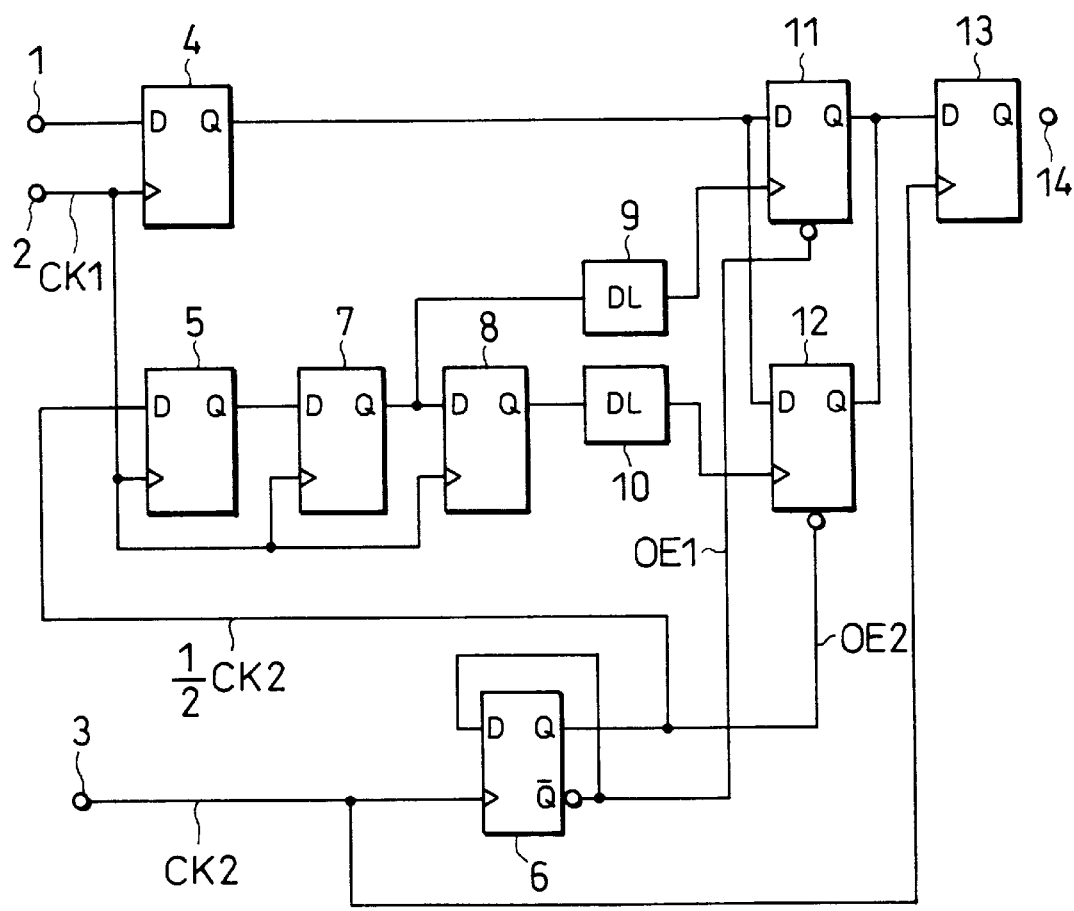
FIG. 11 is a block diagram showing an example of the structure of a second prior art.

As the D-type flip-flop, for example, the one having the structure shown in FIG. 10 can be used. For the sake of explanation, the embodiment using the D-type flip-flop is explained as an example. However, the present invention is not necessarily limited to such a structure, and any device can be used if it is a latching element.

The data line shown in FIG. 1 handles two-bit data. For example, INDATA<1:0> represents a bus consisting of INDATA<1> and INDATA<0>. In the specification hereinbelow, unless otherwise specified, the term "INDATA" means INDATA<1:0> representing a collection of all bits.

Figure 5:
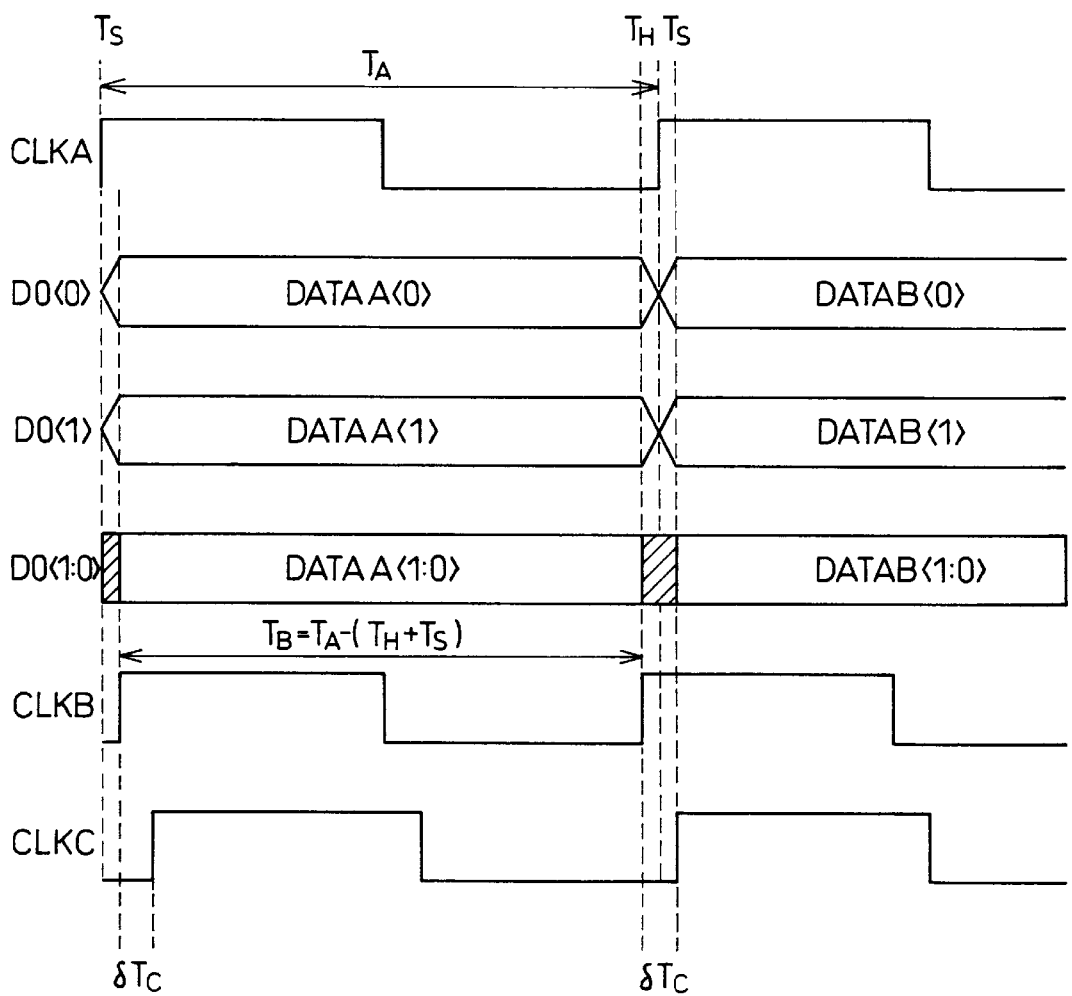
FIG. 5 is a timing chart of signals of respective sections constituting the structure shown in FIG. 1.

FIG. 5 is a timing chart of signals of respective sections constituting the transfer clock converter for digital data shown in FIG. 1. Referring now to FIG. 5, the following description will explain the operation of the converter.

Output data D0<0> and D0<1> of the D-type flip-flop DFF0<1:0> shown in FIG. 1 are outputted according to the timing shown in FIG. 5. Therefore, when the output data D0<1:0> is received in a period (a period in which the hold time and setup time required by the D-type flip-flop cannot be sufficiently ensured) shown by hatching in FIG. 5, there is a possibility that the data is not correct. In this case, the combination of the output data D1, D2 and D3 is any of the combinations shown in Table 1 if the second transfer clock CLKB satisfies the conditions $$2\times(T_H+T_S)<T_B<T_A-(T_H+T_S) \qquad (2)$$

where $T_H$ is the hold time of the D-type flip-flop, $T_S$ is the setup time of the D-type flip-flop, $T_A$ is the cycle of the first transfer clock CLKA, and $T_B$ is the cycle of the second transfer clock CLKB.

TABLE 1

|    | D1     | D2     | D3     |
|----|--------|--------|--------|
| S1 | DATA A | DATA A | DATA A |
| S2 | DATA A | DATA A | X      |
| S3 | DATA A | DATA A | DATA B |
| S4 | DATA A | X      | DATA B |
| S5 | DATA A | DATA B | DATA B |
| S6 | X      | DATA B | DATA B |
| S7 | DATA B | DATA B | DATA B |

Here, "DATA A" and "DATA B" in Table 1 represent data which are synchronized with the first transfer clock CLKA in a period and latched by the D-type flip-flop DFF0, and DATA B is received in synchronization with a rise of the first transfer clock CLKA immediately after receiving DATA A. "X" in Table 1 represents data which is received in the D-type flip-flop DFF3 or DFF4 during the period shown by hatching of D0<1:0>, i.e., the period in which the hold time and setup time required by the D-type flip-flop cannot be ensured sufficiently. Since the value is unpredictable, it is indeterminate.

It is clear from Table 1 that, when data D1 and D2 are identical, at least one of data D1 and D2 is received in a period other than the period shown by hatching. Even when one of the D-type flip-flops DFF3 and DFF4 receives indeterminate data, since the received data is identical with data which is received in the timing in which the indeterminate data cannot be received, the data D1 and D2 can never be indeterminate. On the other hand, when data D1 and D2 are different from each other, it is impossible that data D3 is received in the period shown by hatching.

Therefore, by comparing the data D1 and D2 to determine output data according to Table 2, it is possible to certainly prevent wrong data from being output. Moreover, by comparing the data D2 and D3 to determine output data according to Table 3, the same effect can be produced.

TABLE 2

| CONDITIONS              | OUTPUT |
|-------------------------|--------|
| D1 AND D2 ARE IDENTICAL | D1     |
| D1 AND D2 ARE DIFFERENT | D3     |

TABLE 3

| CONDITIONS              | OUTPUT |
|-------------------------|--------|
| D2 AND D3 ARE IDENTICAL | D3     |
| D2 AND D3 ARE DIFFERENT | D1     |

Figure 8:
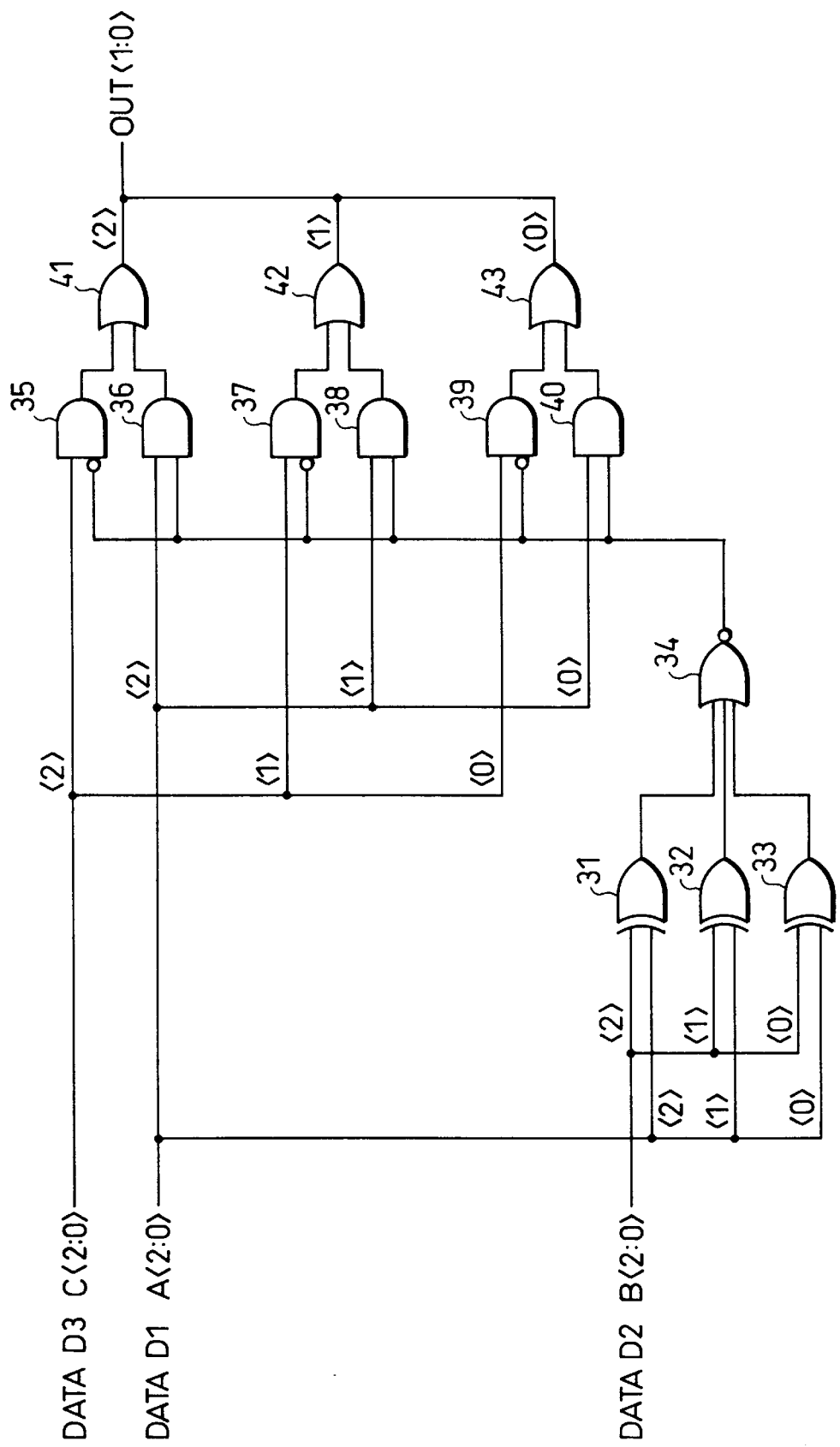
FIG. 8 shows the circuit structure of an example of a comparator-selector circuit shown in FIGS. 1 and 2.

For example, an embodiment of the comparator-selector circuit (COMPARATOR) achieving Table 2 is constructed as shown in FIG. 8. FIG. 8 illustrates an example in which the data line handles three-bit data. However, the present invention is not necessarily limited to this structure.

As shown in FIG. 8, the comparator-selector circuit (COMPARATOR) includes exclusive OR circuits 31 to 33, a NOR circuit 34, AND circuits 35 to 40, and OR circuits 41 to 43.

Data D1 is input to one of the input terminals of each of the exclusive OR circuits 31 to 33, and data D2 is input to the other input terminal. The output terminal of each of the exclusive OR circuits 31 to 33 is connected to the input terminal of the NOR circuit 34. The output terminal of the NOR circuit 34 is connected to the inverted input terminal of each of the AND circuits 35, 37 and 39, and one of the input terminals of each of the AND circuits 36, 38 and 40.

Data D3 is input to the non-inverted input terminal of each of the AND circuits 35, 37 and 39. Data D1 is input to the other input terminals of the AND circuits 36, 38 and 40. The output terminals of the AND circuits 35 and 36 are connected to the input terminals of the OR circuit 41. The output terminals of the AND circuits 37 and 38 are connected to the input terminals of the OR circuit 42. The output terminals of the AND circuits 39 and 40 are connected to the input terminals of the OR circuit 43. The outputs of the OR circuits 41 to 43 are connected to each other, and OUTDATA as output data is outputted from the connected point.

With this structure, for example, when data D1 and D2 are not identical, at least one of the outputs of the exclusive OR circuits 31 to 33 becomes high level, and therefore the output of the NOR circuit 34 becomes low level. In this case, the output of low level is applied to the inverted input terminal of the AND circuit 35, and the data D3 is outputted from the AND circuit 35 to the OR circuit 41.

Meanwhile, the output of the AND circuit 36 is also sent to the OR circuit 41. However, since the output of low level is input to the AND circuit 36 from the NOR circuit 34, the output of the AND circuit 36 becomes low level. Consequently, the data D3 is outputted as OUTDATA from the OR circuit 41.

As described above, when the data D1 and D2 are not identical, the data D3 is outputted as OUTDATA from the comparator-selector circuit (COMPARATOR).

In contrast, when the data D1 and D2 are identical, since all the outputs of the exclusive OR circuits 31 to 33 are low level, the output of the NOR circuit 34 is high level. In this case, since the output of high level is applied to the inverted input terminal of the AND circuit 35, the output of low level is outputted from the AND circuit 35 to the OR circuit 41.

Meanwhile, the output of the AND circuit 36 is also sent to the OR circuit 41. However, since the output of high level is input to the AND circuit 36 from the NOR circuit 34, the data D1 is outputted from the AND circuit 36. Consequently, the data D1 is outputted as OUTDATA from the OR circuit 41.

As described above, when the data D1 and D2 are identical, the data D1 is outputted as OUTDATA from the comparator-selector circuit (COMPARATOR).

For the sake of convenience, the above explanation was given by referring to the operation of a first selector circuit composed of the AND circuits 35, 36 and OR circuit 41. Since the operations of a second selector circuit composed of the AND circuits 37, 38 and OR circuit 42, and a third selector circuit composed of the AND circuits 39, 40 and OR circuit 43 are similar to that of the first selector circuit, the detailed explanation thereof is omitted.

Figure 9:
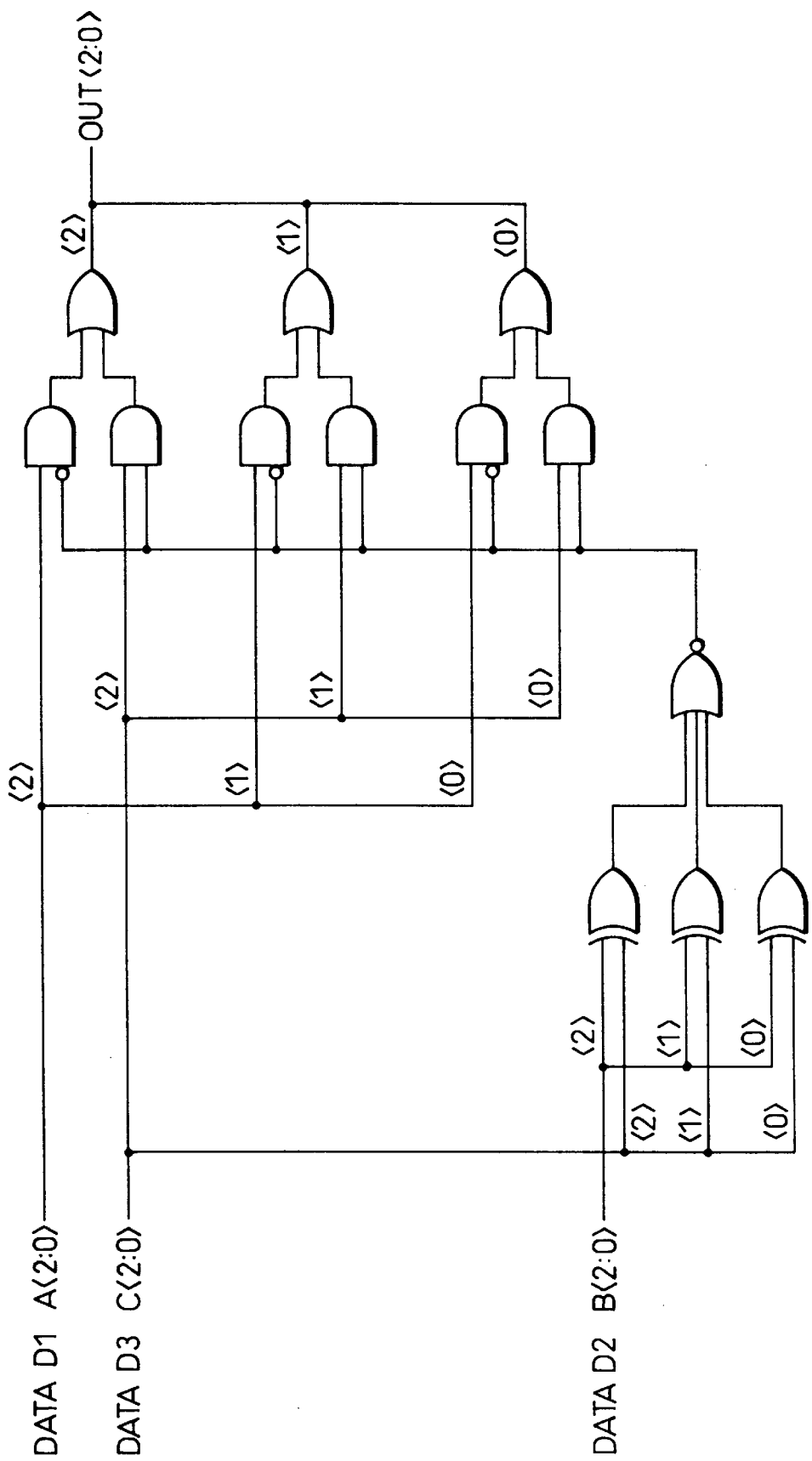
FIG. 9 shows the circuit structure of another example of the comparator-selector circuit shown in FIGS. 1 and 2.

By the way, for example, an embodiment of the comparator-selector circuit (COMPARATOR) achieving Table 3 is constructed as shown in FIG. 9. Since the structure shown in FIG. 9 basically performs the same operation as that of the structure shown in FIG. 8 (though data D3 needs to be replaced by data D1, and data D1 needs to be replaced by data D3), the detailed explanation thereof is omitted.

According to the structure shown in FIG. 9, when the data D2 and D3 are identical, the data D3 is outputted as OUTDATA from the comparator-selector circuit (COMPARATOR). On the other hand, when the data D2 and D3 are not identical, the data D1 is outputted as OUTDATA from the comparator-selector circuit (COMPARATOR).

Figure 2:
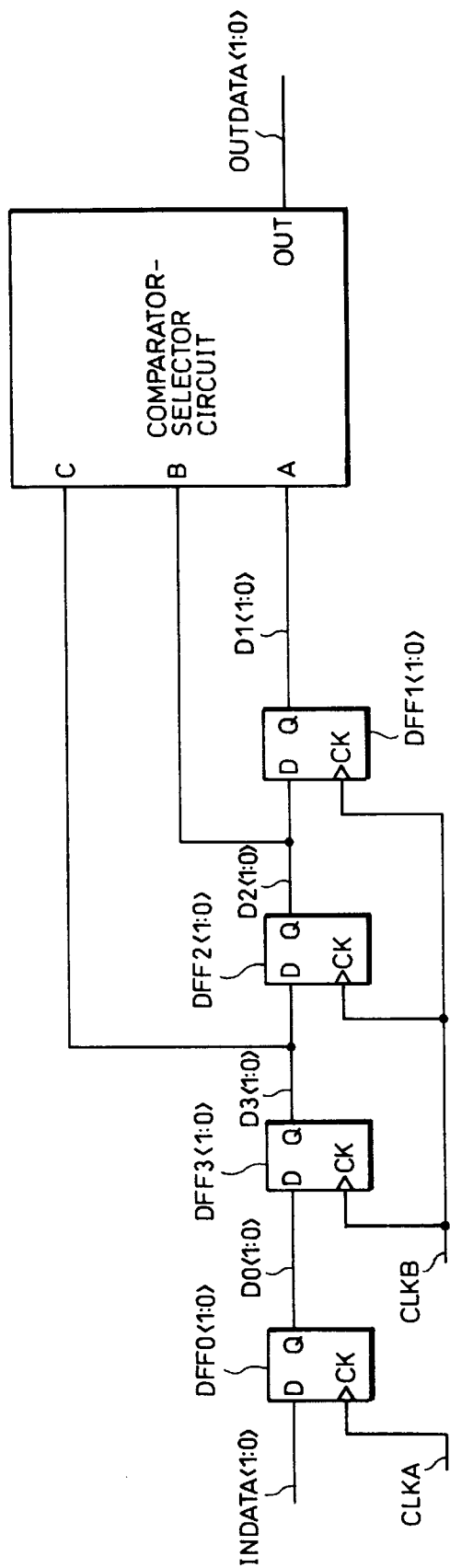
FIG. 2 is a block diagram showing the structure of a transfer clock converter for digital data according to Embodiment 2 of the present invention.
Figure 3:
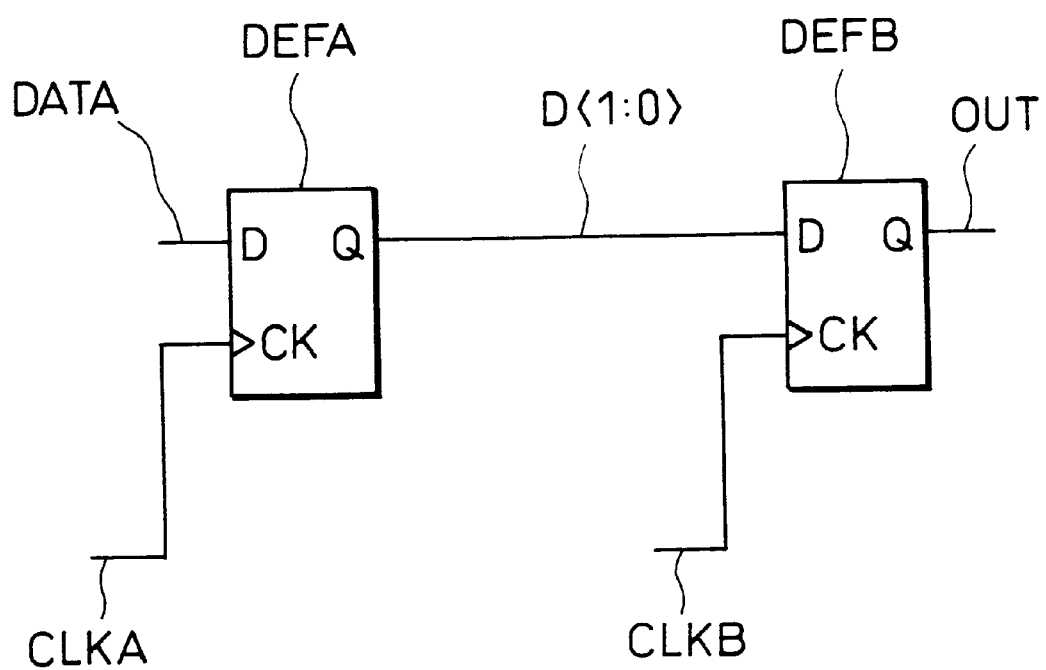
FIG. 3 is a block diagram showing the structure of a conventional clock converter.
Figure 4:
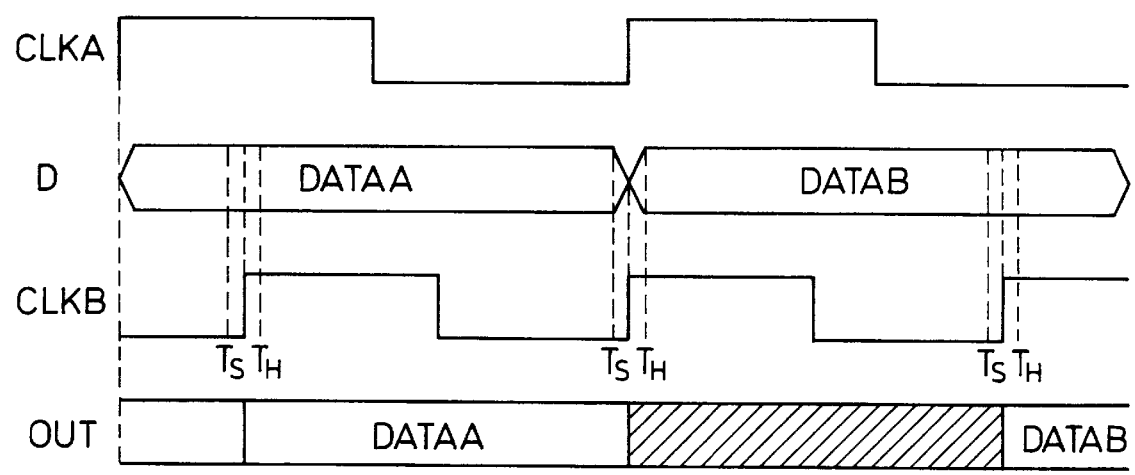
FIG. 4 is a timing chart of signals of respective sections of the conventional clock converter shown in FIG. 3.
Figure 6:
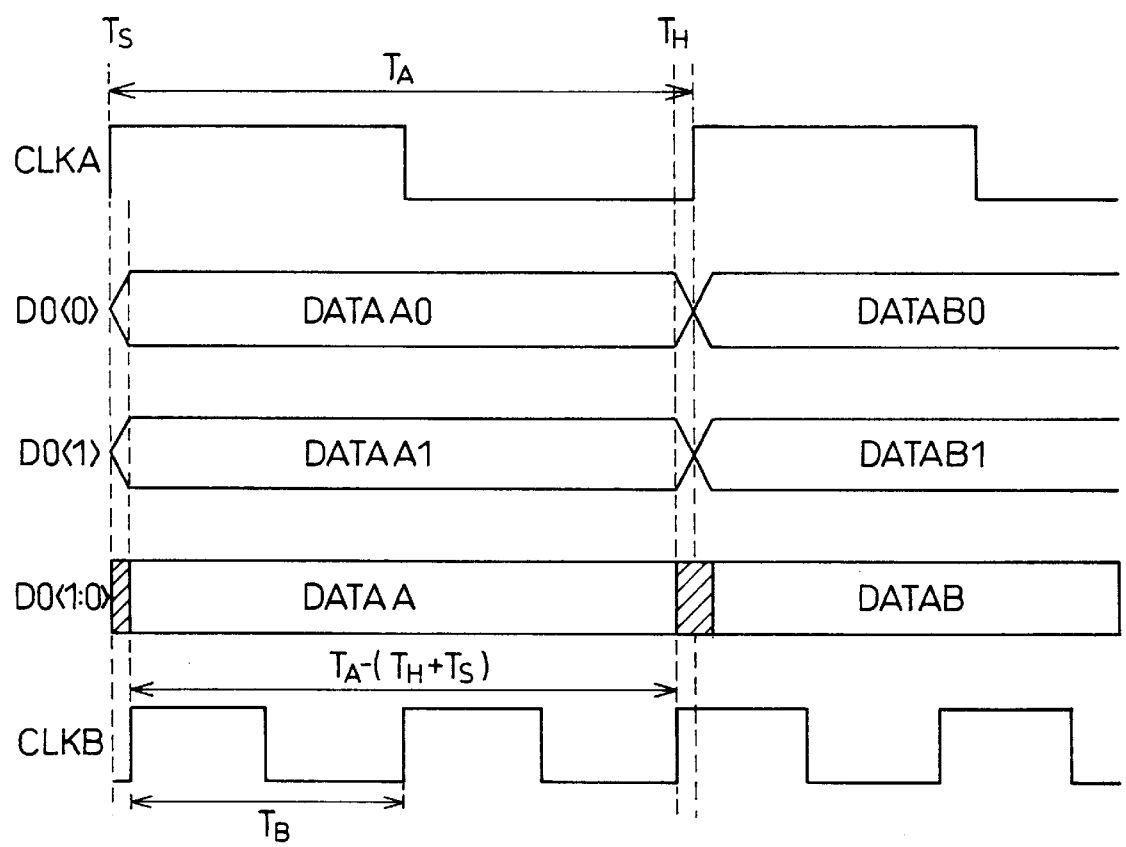
FIG. 6 is a timing chart of signals of respective sections constituting the structure shown in FIG. 2.
Figure 7:
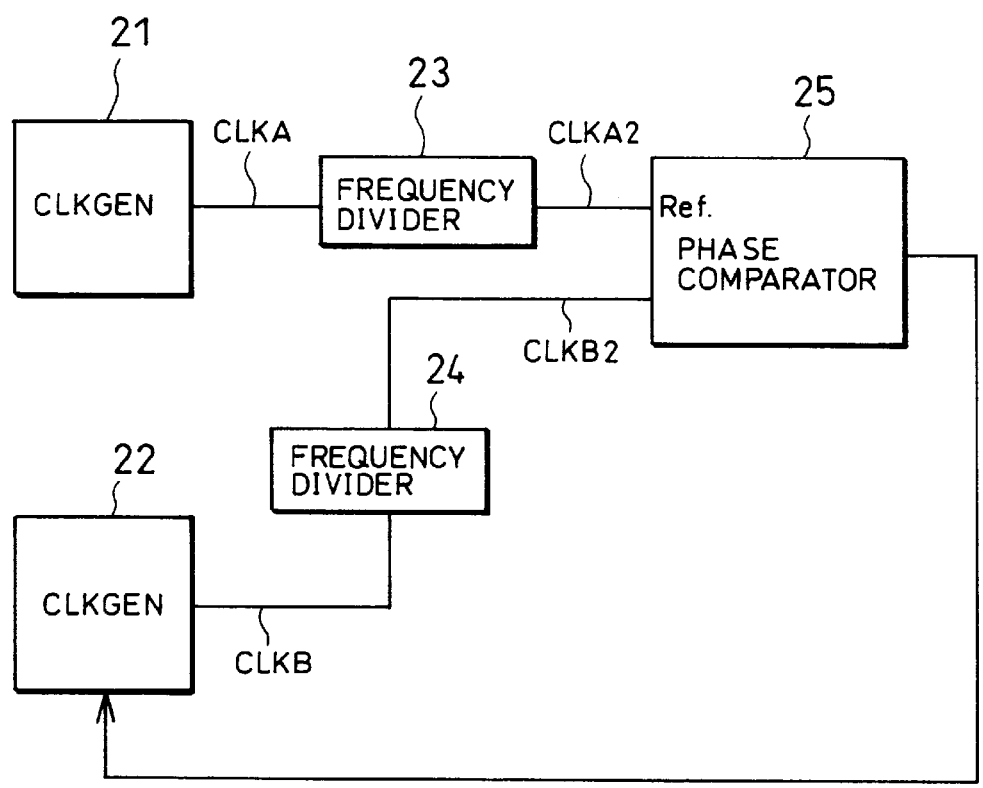
FIG. 7 is a block diagram showing the structure of a conventional clock converter using a PLL circuit.

Referring now to FIGS. 2 and 6, the following description will explain Embodiment 2 of the present invention in detail.

FIG. 2 is a block diagram showing the structure of a transfer clock converter for digital data according to Embodiment 2 of the present invention. In FIG. 2, DFF0 is a D-type flip-flop which receives input digital data INDATA in synchronization with a rise of the first transfer clock CLKA, and outputs the data. DFF3 is a D-type flip-flop which receives the output data D0 of the D-type flip-flop DFF0 in synchronization with a rise of the second transfer clock CLKB, and outputs the data.

DFF2 is a D-type flip-flop which receives the output data D3 of the D-type flip-flop DFF3 in synchronization with a rise of the second transfer clock CLKB, and outputs the data. DFF1 is a D-type flip-flop which receives the output data D2 of the D-type flip-flop DFF2 in synchronization with a rise of the second transfer clock CLKB, and outputs the data.

The comparator-selector circuit (COMPARATOR) is supplied with the output data D1, D2 and D3 of the D-type flip-flops DFF1, DFF2 and DFF3, executes a predetermined comparing and selecting operation on these data, and selects and outputs OUTDATA that is correct output data.

As the D-type flip-flop, for example, the structure shown in FIG. 10 can be used. However, the present invention is not necessarily limited to this structure.

The data line shown in FIG. 2 handles two-bit data. For example, INDATA<1:0> represents a bus consisting of INDATA<1> and INDATA<0>. In the specification hereinbelow, unless otherwise specified, the term "INDATA" means INDATA<1:0> representing a collection of all bits.

FIG. 6 is a timing chart of signals of respective sections constituting the transfer clock converter for digital data shown in FIG. 2. Referring now to FIG. 6, the following description will explain the operation of the converter.

Output data D0<0> and D0<1> of the D-type flip-flop DFF0<1:0> of FIG. 2 are outputted according to the timing shown in FIG. 6. Therefore, when the data D0<1:0> is received in a period (a period in which the hold time and setup time required by the D-type flip-flop cannot be sufficiently ensured) shown by hatching in FIG. 6, there is a possibility that the data is not correct. In this case, the combination of the output data D1, D2 and D3 of FIG. 2 is any of the combinations shown in Table 1 if the second transfer clock CLK satisfies the conditions $$2 \times (T_H + T_S) < T_B < \{T_A - (T_H + T_S)\}/2 \quad (3)$$

where $T_H$ is the hold time of the D-type flip-flop, $T_S$ is the setup time of the D-type flip-flop, $T_A$ is the cycle of the first transfer clock CLKA, and $T_B$ is the cycle of the second transfer clock CLKB.

Thus, in this embodiment like Embodiment 1, by comparing the data D1 and D2 to determine output data according to Table 2 (an example of a circuit structure practically achieved is shown in FIG. 8), it is possible to certainly prevent outputting of wrong data. Moreover, by comparing the data D2 and D3 to determine output data according to Table 3 (an example of a circuit structure practically achieved is shown in FIG. 9), the same effect can be produced.

As described above, a first transfer clock converter for digital data of the present invention is a transfer clock converter for converting digital data synchronized with the first transfer clock into digital data synchronized with the second transfer clock and outputting the converted data, and includes: (1) a delay circuit for introducing a predetermined delay in the transmission of the second transfer clock so as to produce the third transfer clock, and outputting the third transfer clock; (2) a first latching element for latching digital data synchronized with the first transfer clock in accordance with the second transfer clock, and outputting the data; (3) a second latching element for latching digital data synchronized with the first transfer clock in accordance with the third transfer clock, and outputting the data; (4) a third latching element for latching the output data from the first latching element in accordance with the second transfer clock, and outputting the data; (5) a fourth latching element for latching the output data from the second latching element in accordance with the second transfer clock, and outputting the data; and (6) a comparator-selector circuit which is supplied with the output data from the first, third and fourth latching element, selects and outputs output data according to the result of a comparison between predetermined input data.

In the first transfer clock converter for digital data, it is preferred that the delay T of the delay circuit is set so as to satisfy the conditions $$T_H + T_S < T < T_2 - (T_H + T_S)$$

where $T_H$ represents the hold time of the D-type flip-flop, $T_S$ is the setup time of the D-type flip-flop, and $T_2$ is the cycle of the second transfer clock.

In this transfer clock converter for digital data, it is preferred that the comparator-selector circuit compares the output data from the third latching element and the output data from the fourth latching element, and outputs the data if these data are identical or outputs the output data from the first latching element if these data are not identical.

It is preferred to have a structure which compares the output data from the first latching element and the output data from the fourth latching element, and output the data if these data are identical or output the output data from the third latching element if these data are not identical.

As described above, a second transfer clock converter for digital data of the present invention is a transfer clock converter for converting digital data synchronized with the first transfer clock into digital data synchronized with the second transfer clock and outputting the converted data, and includes: (1) a first latching element for latching digital data synchronized with the first transfer clock in accordance with the second transfer clock, and outputting the data; (2) a second latching element for latching the output data from the first latching element in accordance with the second transfer clock, and outputting the data; (3) a third latching element for latching the output data from the second latching element in accordance with the second transfer clock, and outputting the data; and (4) a comparator-selector circuit which is supplied with the output data from the first, second and third latching elements, and selects and outputs output data according to the result of a comparison between predetermined input data.

In the second transfer clock converter for digital data, it is preferred that the comparator-selector circuit compares the output data from the second latching element and the output data from the third latching element, and outputs the data if these data are identical or outputs the output data from the first latching element if these data are not identical.

Moreover, in the second transfer clock converter for digital data, it is preferred that the comparator-selector circuit is constructed to compare the output data from the first latching element and the output data from the second latching element, output the data if these data are identical or output the output data from the third latching element if these data are not identical.

With the transfer clock converter for digital data having such a structure, since the first transfer clock and the second transfer clock do not rise at the same time, the comparator-selector circuit always selects and outputs correct data, thereby significantly improving the reliability of the circuit as a whole.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transfer clock converter for digital data, for converting digital data synchronized with a first transfer clock into digital data synchronized with a second transfer clock, comprising:

a delay circuit for generating a third transfer clock by introducing a predetermined delay in outputting the second transfer clock;

a first latching element for latching the digital data synchronized with the first transfer clock in synchronization with the second transfer clock;

a second latching element for latching the digital data synchronized with the first transfer clock in synchronization with the third transfer clock;

a third latching element for latching output data from said first latching element in synchronization with the second transfer clock;

a fourth latching element for latching output data from said second latching element in synchronization with the second transfer clock; and a comparator-selector circuit for comparing the output data from said first, third and fourth latching elements, for selecting output data to be output according to a result of the comparison, and for outputting the selected output data.

2. The transfer clock converter for digital data as set forth in claim 1, wherein said delay circuit introduces a delay T satisfying $T_H+T_S<T<T_2-(T_H+T_S)$ where $T_H$ represents a hold time of said latching elements, $T_S$ is a setup time of said latching elements, and $T_2$ is a cycle of the second transfer clock.

3. The transfer clock converter for digital data as set forth in claim 1, wherein said comparator-selector circuit compares output data from said third latching element and output data from said fourth latching element, and outputs the output data if these data are identical, while outputs the output data from said first latching element if these data are not identical.

4. The transfer clock converter for digital data as set forth in claim 2, wherein said comparator-selector circuit compares output data from said third latching element and output data from said fourth latching element, and outputs the output data if these data are identical, while outputs the output data from said first latching element if these data are not identical.

5. The transfer clock converter for digital data as set forth in claim 1, wherein said comparator-selector circuit compares output data from said first latching element and output data from said fourth latching element, and outputs the output data if these data are identical, while outputs output data from said third latching element if these data are not identical.

6. The transfer clock converter for digital data as set forth in claim 2, wherein said comparator-selector circuit compares output data from said first latching element and output data from said fourth latching element, and outputs the output data if these data are identical, while outputs the output data from said third latching element if these data are not identical.

7. The transfer clock converter for digital data as set forth in claim 3, wherein said comparator-selector circuit includes:

an exclusive OR circuit for performing an exclusive OR operation on the output data from said third latching element and the output data from said fourth latching element;

a NOR circuit for performing a NOR operation on an output from said exclusive OR circuit;

a first AND circuit for performing an AND operation on the output data from said first latching element and an inverse of an output from said NOR circuit;

a second AND circuit for performing an AND operation on the output data from said third latching element and the output from said NOR circuit; and an OR circuit for performing an OR operation on outputs from said first and second AND circuits; and for outputting a result of the operation as selected output data.

8. The transfer clock converter for digital data as set forth in claim 4, wherein said comparator-selector circuit includes:

an exclusive OR circuit for performing an exclusive OR operation on the output data from said third latching element and the output data from said fourth latching element;

a NOR circuit for performing a NOR operation on an output from said exclusive OR circuit;

a first AND circuit for performing an AND operation on the output data from said first latching element and an inverse of an output from said NOR circuit;

a second AND circuit for performing an AND operation on the output data from said third latching element and the output from said NOR circuit; and an OR circuit for performing an OR operation on outputs from said first and second AND circuits, and for outputting a result of the operation as selected output data.

9. The transfer clock converter for digital data as set forth in claim 5, wherein said comparator-selector circuit includes:

an exclusive OR circuit for performing an exclusive OR operation on the output data from said first latching element and the output data from said fourth latching element;

a NOR circuit for performing a NOR operation on an output from said exclusive OR circuit;

a first AND circuit for performing an AND operation on the output data from said third latching element and an inverse of an output from said NOR circuit;

a second AND circuit for performing an AND operation on the output data from said fourth latching element and the output from said NOR circuit; and an OR circuit for performing an OR operation on outputs from said first and second AND circuits, and for outputting a result of the operation as selected output data.

10. The transfer clock converter for digital data as set forth in claim 6, wherein said comparator-selector circuit includes:

an exclusive OR circuit for performing an exclusive OR operation on the output data from said third latching element and the output data from said fourth latching element;

a NOR circuit for performing a NOR operation on an output from said exclusive OR circuit;

a first AND circuit for performing an AND operation on the output data from said first latching element and an inverse of an output from said NOR circuit;

a second AND circuit for performing an AND operation on the output data from said third latching element and the output from said NOR circuit; and an OR circuit for performing an OR operation on outputs from said first and second AND circuits, and for outputting a result of the operation as selected output data.

11. The transfer clock converter for digital data as set forth in claim 10, wherein said first to fourth latching elements are D-type flip-flops.

12. A transfer clock converter for digital data for converting digital data synchronized with a first transfer clock into digital data synchronized with a second transfer clock, comprising:

a first latching element for latching the digital data synchronized with the first transfer clock in synchronization with the second transfer clock;

a second latching element for latching output data from said first latching element in synchronization with the second transfer clock;

a third latching element for latching output data from said second latching element in synchronization with the second transfer clock; and a comparator-selector circuit for comparing the output data from said first, second and third latching elements, for selecting output data to be output according to a result of the comparison, and for outputting the selected output data.

13. The transfer clock converter for digital data as set forth in claim 12, wherein said comparator-selector circuit compares the output data from said second latching element and the output data from said third latching element, and outputs the data if these output data are identical, while outputs the output data from said first latching element if these output data are not identical.

14. The transfer clock converter for digital data as set forth in claim 12, wherein said comparator-selector circuit compares the output data from said first latching element and the output data from said second latching element, and outputs the data if these output data are identical while outputs the output data from said third latching element if these output data are not identical.

15. The transfer clock converter for digital data as set forth in claim 13, wherein said comparator-selector circuit includes:

an exclusive OR circuit for performing an exclusive OR operation on the output data from said third latching element and the output data from said second latching element;

a NOR circuit for performing a NOR operation on an output from said exclusive OR circuit;

a first AND circuit for performing an AND operation on the output data from said first latching element and an inverse of an output from said NOR circuit;

a second AND circuit for performing an AND operation on the output data from said third latching element and the output from said NOR circuit; and an OR circuit for performing an OR operation on outputs from said first and second AND circuits, and outputting a result of the operation as selected output data.

16. The transfer clock converter for digital data as set forth in claim 14, wherein said comparator-selector circuit includes:

an exclusive OR circuit for performing an exclusive OR operation on the output data from said first latching element and the output data from said second latching element;

a NOR circuit for performing a NOR operation on an output from said exclusive OR circuit;

a first AND circuit for performing an AND operation on the output data from said third latching element and an inverse of an output from said NOR circuit;

a second AND circuit for performing an AND operation on the output data from said second latching element and the output from said NOR circuit; and an OR circuit for performing an OR operation on outputs from said first and second AND circuits, and outputting a result of the operation as selected output data.

17. The transfer clock converter for digital data as set forth in claim 12, wherein said first to third latching elements are D-type flip-flops.

18. A method of converting a transfer clock for digital data by converting digital data synchronized with a first transfer clock into digital data synchronized with a second transfer clock and outputting the digital data, comprising the steps of:

generating a plurality of candidate output data based on input digital data in converting a transfer clock for digital data; and comparing the plurality of candidate output data with each other, selecting output data to be output according to a result of the comparison, and outputting the selected output data.

* * * * *